(12) United States Patent
Finamore et al.

(10) Patent No.: US 11,551,139 B1
(45) Date of Patent: Jan. 10, 2023

(54) TRANSPORTATION ACTIVITY CLASSIFICATION SYSTEM AND METHOD

(71) Applicant: Gridwise, Inc., Pittsburgh, PA (US)

(72) Inventors: Brian Finamore, Pittsburgh, PA (US); Ryan Green, Pittsburgh, PA (US)

(73) Assignee: GRIDWISE, INC., Pittsburgh, PA (US)

( * ) Notice: Subject to any disclaimer, the term of this patent is extended or adjusted under 35 U.S.C. 154(b) by 719 days.

(21) Appl. No.: 16/527,775

(22) Filed: Jul. 31, 2019

Related U.S. Application Data

(60) Provisional application No. 62/712,702, filed on Jul. 31, 2018.

(51) Int. Cl.
*G06N 20/00* (2019.01)
*G06Q 50/30* (2012.01)
*G06N 5/04* (2006.01)

(52) U.S. Cl.
CPC ............. *G06N 20/00* (2019.01); *G06N 5/047* (2013.01); *G06Q 50/30* (2013.01)

(58) Field of Classification Search
CPC .... G06Q 50/30; G06Q 10/0833; G06Q 10/04; G06Q 10/0631; G06N 20/00; G06N 7/005; G01C 21/3492; G01C 21/343; G01C 21/3423; G01C 21/3484; G01C 21/3461; G01C 21/34; G01C 21/3446; G01C 21/00; G01C 21/30; H04W 4/029; H04W 4/40; G08G 1/202; G08G 1/0112; G08G 1/0129
See application file for complete search history.

(56) References Cited

U.S. PATENT DOCUMENTS

| | | | |
|---|---|---|---|
| 7,428,449 B2 | 9/2008 | Fehr et al. | |
| 8,260,515 B2 | 9/2012 | Huang et al. | |
| 2013/0059607 A1* | 3/2013 | Herz | G01C 21/3617 455/456.3 |
| 2017/0048672 A1* | 2/2017 | Herz | G06Q 10/1093 |
| 2017/0099582 A1 | 4/2017 | Boesen | |
| 2018/0053108 A1 | 2/2018 | Olabiyi et al. | |
| 2018/0130095 A1* | 5/2018 | Khoury | G06Q 30/0266 |
| 2019/0066409 A1 | 2/2019 | Moreira da Mota | |
| 2019/0259044 A1* | 8/2019 | Kawashima | G07C 5/008 |

* cited by examiner

*Primary Examiner* — Khalid W Shaheed
(74) *Attorney, Agent, or Firm* — K&L Gates LLP

(57) ABSTRACT

A computer-enabled system and method that collects and processes various data from mobile devices possessed by on-demand ("ride-hailing") transportation drivers, along with other possible external data sources, and subsequently recognizes, classifies, stores, and delivers ride-hailing-related activity information of individual or multiple drivers to various consumers of the system, while also iteratively improving the system and method's ride-hailing activity classification accuracy over time.

22 Claims, 3 Drawing Sheets

TRANSPORTATION ACTIVITY CLASSIFICATION SYSTEM AND METHOD

PRIORITY CLAIM

The present invention claims priority to U.S. provisional application Ser. No. 62/712,702, filed Jul. 31, 2018, which is incorporated herein by reference in its entirety.

BACKGROUND OF THE INVENTION

The present invention is in the technical field of transportation software systems. More particularly, the present invention is in the technical field of ride-hailing transportation data analytics and activity recognition.

Many transportation service providers ("services") exist to facilitate the logistics of pairing vehicle operators ("drivers") offering transportation service to one or more ride requesters ("riders" or "passengers") who are attempting to get from point A to B. Such "ride-hailing" services may be requested a number of ways, including street hailing, booking over the telephone, or requesting through a mobile application on an internet-enabled mobile computing device ("mobile device"). These requests can be thought of as "on-demand," meaning that upon the rider's request the driver will be notified to pick the rider up at or near the rider's current location, and transport the rider to the desired destination. Additionally, drivers are often employed by the services as independent contractors, and are able to work for multiple service providers at a schedule of their choosing. The service providers who facilitate transportation between drivers and riders possess first-hand records of transportation-related activity for their own driver fleets, such as records of all working hours and trips performed by each driver, passenger pickup and dropoff locations, etc. However, no sufficient system currently exists for the participating drivers or other interested third parties to gather and learn from similar types of transportation activity data, whether it be activity for a single service or across multiple services in aggregate.

SUMMARY OF THE INVENTION

In one general aspect, the present invention is directed to computer-implemented systems and method for collecting various data from mobile devices possessed by on-demand (or "ride-hailing") transportation drivers, along with other possible external data sources. This raw transportation activity indicator data (AID) is then subsequently processed, analyzed, and classified to generate derived ride-hailing activity data of individual drivers, or multiple drivers in aggregate, who are operating within a single service or possibly across multiple services. The derived ride-hailing activity data can be representative of the transportation activity that likely occurred, such as, for example, identifying time periods when the driver was working for a ride-hailing service or not working, and when working, when the driver was transporting passengers, waiting for passengers at the pickup (origin) location, letting passengers out at the drop-off (destination) location, driving around waiting for a passenger request, e.g. circling around ("cruising") or waiting nearby a popular venue, etc. This derived transportation activity data can then be further analyzed within the system to generate derived ride-hailing-related analytics and insights, which can be subsequently delivered back to the drivers and other various third-party consumers of the system.

Among other things, the derived transportation activity data can help drivers optimize their driving activity. This benefit is particularly valuable for drivers who work for ride-hailing services. For example, the derived transportation activity data and insight derived therefrom can allow ride-hailing drivers to better understand when and where they should be working. The derived transportation activity data is also valuable for managing a fleet of drivers, or multiple fleets of drivers working for a plurality of services simultaneously. These and other benefits realizable with embodiments of the present invention will be apparent from the description below.

BRIEF DESCRIPTION OF THE DRAWINGS

Various embodiments of the present invention are described herein by way of example in conjunction with the following figures.

DESCRIPTION

Figure 1:
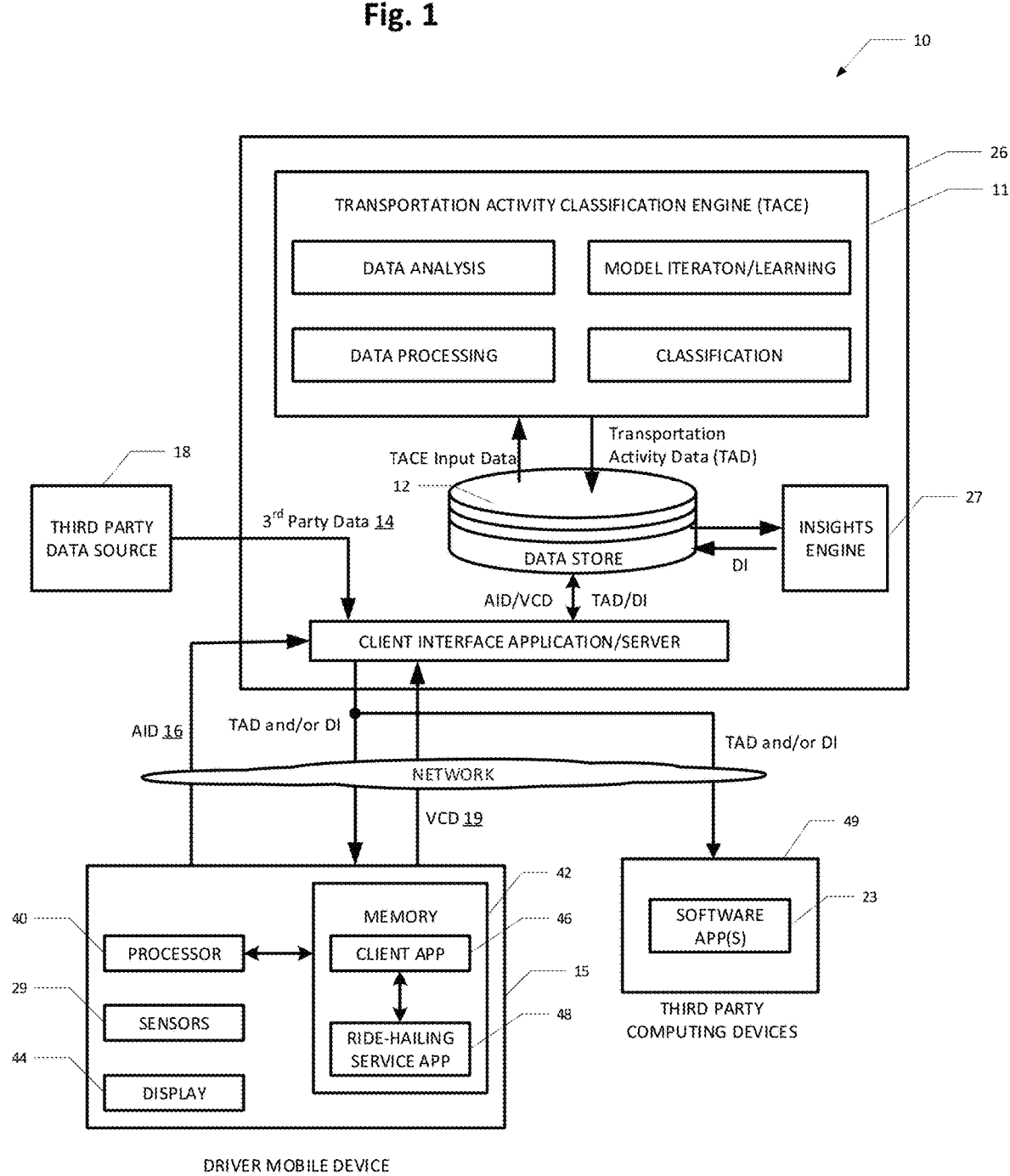
FIG. 1 is an example system of the present invention.

Referring now to the invention in more detail, FIG. 1 shows an example system that implements the methods described herein for classifying input data from drivers/vehicles and outputting transportation activity data into storage and/or for consumption by the driver, another end consumer, or another software application. In the example system 10 depicted, timestamped activity indicator data (AID) 16 are sent wirelessly from the mobile devices 15 of one or more vehicle operators (e.g., automobile drivers) to a communication network ("network") 22, such as the Internet, to a remote back-end computing system 26. The vehicle operators ("drivers") may work as drivers for one or more ride-hailing services, including sometimes simultaneously, although some of their driving time is spent not working for any ride-hailing service or only for a subset of the services. The remote back-end computing system 26 supports the transportation activity classification functions for the drivers as described herein.

The remote back-end computing system 26 may comprise one or, more preferably, a number of networked computer devices, e.g., application or database servers, mainframes, laptops, personal computers, etc. Where the remote back-end computing system 26 comprises multiple computer devices, the multiple computer devices may be interconnected via a network, such as a LAN, WAN, the Internet, etc., and the multiple computer devices may be located together ("co-located") or distributed across a geographically disperse network. For example, in a cloud computing environment, the remote back-end computing system 26 could be hosted on a cluster of servers, which may themselves via physically together or apart. The number of computer devices and/or the overall processing capability of the remote back-end computing system 26 can vary in real-world implementations in order to support communications with higher volumes of mobile devices 15. For example, as shown in FIG. 1, the remote back-end computing system 26 may include a Transportation Activity Classification engine (TACE) 11, which is described further below. In some applications, the Transportation Activity Classification engine 11 may be implemented with a single standalone computing device that is part of the remote back-end computing system 26 and that is accessible by other computer devices in the remote back-end computing system 26 over a network.

Referring still to the example system 10 in FIG. 1, the driver devices 15 may comprise: general computing hardware, such as CPU 40, memory 42, radio communication hardware (not shown), etc. that runs general purpose operating software ("OS"); a display 44 (e.g., a touchscreen display); sensing hardware 29 ("sensors"), which may include GPS, cellular radios/antennas, accelerometers, gyroscopes, Bluetooth and Wi-Fi radios/antennas, microphones, charging ports, etc.; and an installed client software application ("client application") 46, which facilitates data collection and transmission to the remote back-end computing system 26. Driver devices 15 are located on the driver's person or in the vehicle with the driver while they are driving, but the driver may or may not be on a working period ("shift") at any given time (given the nature of ride-hailing services, a driver may sometimes be off-duty while operating the vehicle). In particular, the driver devices 15 may be mobile computing devices, such as smartphones, tablet computers, wearable computers, or otherwise portable personal computers, such as laptops. In the preferred embodiment, AID 16 is comprised of both data collected automatically by the client application 46, as well as driver-input data manually entered by the driver (or another user of the mobile device 15) into the client application. The data are timestamped by the client application according to when the data was sensed/generated.

Where the driver works for one or more ride-hailing services, in addition to the client application 46, the driver's mobile device 15 may additionally include one or more ride-hailing service software applications ("ride-hailing service applications") 48, which communicate with the ride-hailing services' back end computer systems (not shown), which, in preferred embodiments, are different and separate from the remote back-end computing system 26 in FIG. 1. A driver can signify via each ride-hailing service application 48 that the driver is ready to start working a shift by tapping, for example, a "Go Online" button on the app interface; and may end a shift by tapping "Go Offline" via the app interface. When working a shift, the ride-hailing service's back end computer system informs the driver which rider to pick up and where. In particular, the ride-hailing service application 48 may inform the driver of a passenger(s) in the vicinity of driver's current location that is seeking a ride and allow the driver to accept a passenger pick-up request to pick up the passenger at the passenger's specified pick-up location. The ride-hailing service application 48 may also provide navigation instructions to the passenger's pick-up location. The ride-hailing service application 48 may instruct inform the driver about when the passenger has been notified, via the passenger's app, that the driver has arrived at the pick-up location. The ride-hailing service application 48 can also provide ways for the driver to contact the passenger by text or phone, for example. Once the passenger enters the vehicle, the driver can specify that the trip has started via the ride-hailing service application 48. The application 48 can also provide navigation to the desired drop-off location, or the driver may alternatively use a separate third-party navigation application also installed on driver device 15. Finally, when a passenger trip is complete, the driver may, via the app interface, indicate that the trip is complete and rate the passenger and/or trip.

Some of the AID 16 collected by the client application 46 can include data about driver interactions with the ride-hailing service application 48, as described below. The AID 16 may also include in some cases data provided directly from the ride-hailing service application 48. The software for these applications, e.g., the client application 46 and the ride-hailing service application 48, may be stored in the memory 42 of the drivers' mobile devices 15 and executed by the processor(s) 40 thereof.

Additionally, optional external data sources 18 not located on the driver mobile devices 15 may also provide additional third-party data 14 to the remote back-end computing system 26 for consideration, particularly for consideration by the TACE 11. The third-party data 14 is also preferably timestamped in similar fashion to AID 16. Further, the driver's mobile device 15 may include other third-party software applications ("third-party applications") (not shown), such as map or navigation programs, texting apps, search engines, browsers, etc. In many cases, drivers may be running/interacting with those other third-party applications (including the ride-hailing service app(s) 48) on devices 15 in addition to the client application 46 while working a shift. AID 16 collected from devices 15 and third party data 14 are stored in a data store 12 for later use in classifying transportation activity as described herein. The data store 12 may be implemented with a suitable data storage device for persistently storing and managing digital data, such as a magnetic (HDD), optical (DVD) and/or semiconductor (Flash) storage media. In some embodiments data store 12 comprises an entire database server, which includes a database operating system running on another computing device that provides the storage media, and in this case data store 12 may be remotely located and accessed by other computers of the remote back-end computing system 26 via a network connection. Also, although the data store 12 in FIG. 1 is shown as a single data store, the data store may comprise multiple data stores (e.g., "federated" or "distributed" databases) that are interconnected via a network. Separate data stores may store separate types of data, for example. As mentioned above, much of the data stored in the data store is timestamped.

Figure 2:
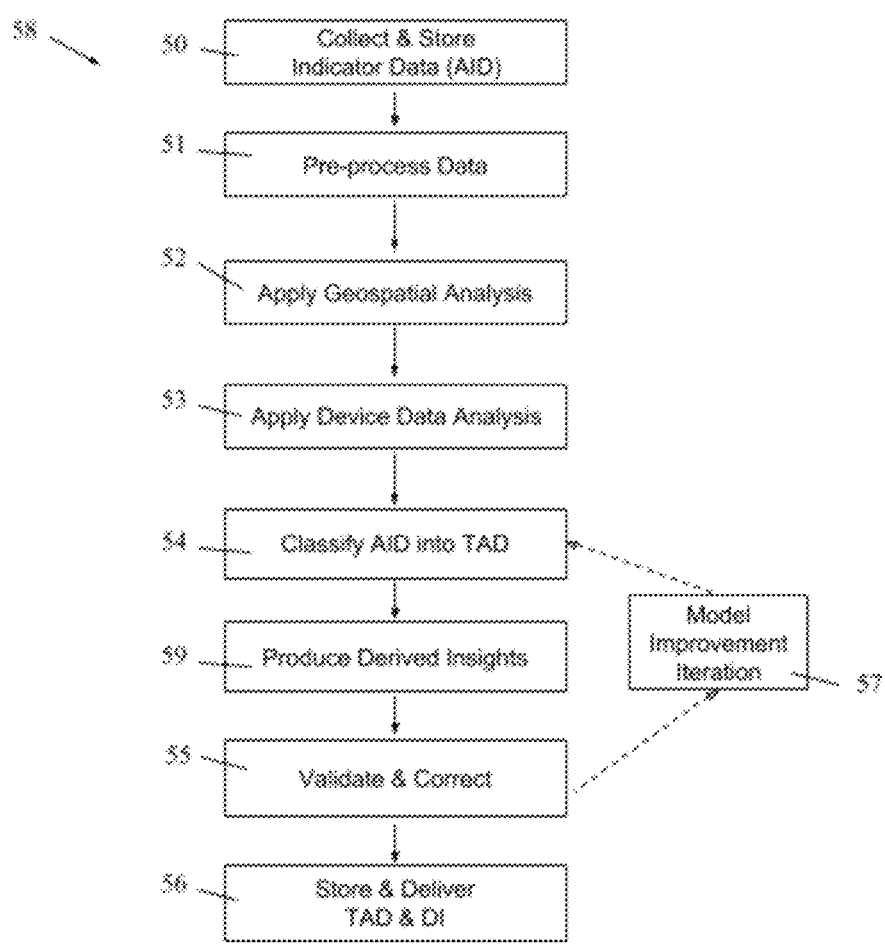
FIG. 2 is a flow-diagram of steps of an example method performed by the system of FIG. 1 according to various embodiments of the present invention.

Referring still to the example system 10, the remote computing system 26 includes a transportation activity classification engine (TACE) 11, which retrieves AID 16 and third party data 14 (collectively, "TACE input data") from the data store 12, and performs data processing, analysis, and classification operations on the TACE input data (e.g., using a method shown in FIG. 2). In the classification step within TACE 11, TACE 11 applies one or more stages of classification model(s) or techniques to characterize composite time-synced TACE input data as being indicative of ride-hailing-related activity or not, and if so, what type of activity. TACE 11 outputs ride-hailing transportation activity data (TAD), preferably along with some probability or confidence of the correctness/accuracy of that TAD, and stores it in data store 12 or another similar data store. In various embodiments, the TAD may be generated from the AID in near-real-time or as soon as sufficiently accurate TAD can be generated from the AID. The TAD could also be generated periodically, such as at certain times of day each day, or each week, etc.

In some embodiments, the remote back-end computing system 26 may further comprise an insights engine 27, which retrieves TAD from the data store 12 or directly from the output of TACE 11, and further analyzes or aggregates TAD to generate other derived analytics and insights ("DI") from TAD data. The DI may include, for example, aggregate ride-hailing supply and demand analytics in a given geographic region, for an individual rideshare service or combined across multiple rideshare services. The insights engine 27 then stores the DI in the data store 12 for later reference.

At a later point in time, the TAD and/or the DI may optionally be delivered to some or all of driver devices 15 for display and review. In a preferred embodiment, drivers are able to confirm or correct (via the client application 46 running on the drivers' devices 15) the system's TAD outputs generated from their own input AID 16, and also confirm/correct the corresponding metadata attributes of the TAD. This validation and correction data (VCD) 19 is reported back to the remote back-end computing system 26 from the client application 46 running on the drivers' mobile devices 15 in order to iteratively improve the classification accuracy of the TACE 11 over time. These improvement iterations for the TACE 11 may happen continuously following each classification system iteration, or less frequently, with only periodic updates to the model and algorithms employed in TACE 11. Further, these improvement iterations may happen "online" within the live system automatically, or they may occur "offline" and require software updates to TACE 11.

Finally, in preferred embodiments, one or more third-party computing devices 49 running software applications 23, which are distinct from the driver devices 15, may also be present in the system for consuming (via the network 22) TAD and DI generated by the remote system 26. The format of the data delivered to these third-party devices 49 and applications 23 could take on a variety of forms. The data could be visual in nature, e.g., HTML that renders visualizations or displays various metrics associated with generated TAD and DI; or it could be a feed of structured data delivered via an Application Programming Interface (API) that is consumed by the software application 23 (with or without a user interface); or the data could be delivered in the form of a document or report using common methods of electronic document delivery, e.g. email, FTP, shared cloud file storage systems, or download links hosted on a website.

In more detail, still referring to the example system 10 shown in FIG. 1, in some embodiments, the driver devices 15 may be smartphones, and the services may be those provided by Transportation Network Companies (TNCs) such as Uber, Lyft, Via, etc. That is, for example, the ride-hailing service application 48 could be a software application that a driver for a TNC installs on the driver's mobile device 15 and utilizes while working to provide ride-hailing services for the applicable TNC. In such case, the AID 16 collected from devices 15 may include, but are not limited to: geolocation data derived from device location sensors such as GPS or cellular radios on the drivers' mobile devices 15 (e.g., timestamped latitude, longitude, speed, heading, and altitude data); inertial sensor data such as from accelerometers, gyroscopes, magnetometers, etc. on the drivers' mobile devices 15 (subject to sensor availability on a given driver device); derived motion activity data (e.g., driving, sitting in a running, idle vehicle, etc.) from said inertial sensors made available by the OS of the driver device 15; application lifecycle/usage/interaction data (e.g. app session data, app launch/foreground/background events, user interface interactions/gestures, network requests, incoming messages, notifications, etc.) from other installed applications ("third party applications," including, for example, the ride-hailing service app 48, mapping and driving navigation applications, mileage tracking applications, etc.) on the driver device 15 made available by the OS of the driver device 15 or otherwise obtained and reported by the client application 46; characteristic audio signals collected and identified through the microphone of the driver device 15 (e.g. bells and sounds common to third-party applications associated with performing ride-hailing services, passenger voices, vehicle ingress/egress, etc.); radio signal data (e.g. signal strength, S SID, etc.) from Bluetooth, Wi-Fi, or cellular radio scans that may be detected by client application 46 on the driver device 15 and that are indicative of the presence/absence of other computing/radio devices additional to device 15 inside of the vehicle; device battery and charging status data (e.g., a device was plugged into a charging port); etc. The sensors and/or data signals listed above may be made available to client application 46 by the stock operating system (OS) pre-installed on the driver devices 15, via the OS's provisioned publicly or privately accessible application programming interfaces (APIs). Alternatively, special privileged control ("root access") of the stock OS may be provisioned on some or all of the driver devices 15 to allow the developer of client application 46 to access sensors and/or data signals not otherwise made available by the stock OS. Yet another alternative for accessing said sensors/data could be to install custom modified versions of the stock OS on driver devices 15 that include the necessary APIs leveraged by client application 46.

Further, in some embodiments, the AID 16 may also include occasional indications or acknowledgements from the driver via the user interface provided by the client application 46 that indicate TAD directly and with certainty, such as (timestamped) indications of working shift starts/ends/pauses, passenger pickup/dropoff locations, number of passengers, number of trips completed, amount of earnings received, service(s) of operation, etc. Such indications AID 16 may be input manually by drivers on the devices 15 via buttons/controls within the user interface provided by the client application 46, or may alternatively be input using voice commands processed and interpreted by the client application 46 via a microphone installed on the devices 15. Driver-contributed AID 16 may also be input using a separate piece of commercially available hardware external to drive mobile devices 15 in the vehicle, but communicated over a network to the devices 15 (e.g. Bluetooth button or wearable computing device such as a smartwatch or "hands-free" smartphone headset or earpiece). Further, such driver-contributed AID 16 may be input in real-time as activities occur over the course of driving a shift, or at some time after the driver has performed the activity, e.g. the end of the shift, and may be input proactively by the driver, or in response to a prompt from the client application 46.

Still in more detail, still referring to the invention of FIG. 1, the third party data may include vehicle telematics data including but not limited to vehicle velocity, acceleration, odometer readings, fuel levels, vehicle door opens/closes, seat belt fastens/unfastens, seat load sensor data, etc. Such telematics-related data may be provided to the remote back-end computing system 26 from external third party data source(s) 18, which may be a telematics (vehicle diagnostics) service provider or the manufacturer of the vehicle itself. Such telematics-related data may have originated from the vehicle's computer or an aftermarket onboard diagnostics device installed on the vehicle, and transmitted to the external source(s) 18 prior to collection by remote back-end computing system 26. The third party data could also be other environmental or contextual data not pertaining to drivers or vehicles, such as weather data, community events data, transit data, point of interest data, or other external conditions or features in the region of service operation that may contribute to the probability of transportation activity occurring. The external source(s) 18 may be a database containing such non-driver related data, or another computing device running a software application that provides such data over the network 22 to the remote back-end computing system 26. The remote back-end computing system 26 may request and receive such third party data in a data feed format from the third party data source(s) 18 over the network 22, or the third party data may be proactively sent ("pushed") to the remote back-end computing system 26 over the network 22 and stored in the data store 12 until needed.

Any suitable machine-learning classification and/or pattern recognition models or algorithms may be used by TACE 11 to classify the transportation activity of the drivers depending on the specific kinds of TAD desired, such as but not limited to, logistic regression, decision trees, random forest, gradient-boosted tree, Naive Bayes, neural networks, support vector machines, etc. Further, the machine-learning classification and/or pattern recognition models and/or algorithms may be applied individually or in various combinations or "ensembles." The models and/or algorithms may be initially "trained" using a combination of historical AID 16 initially collected from some or all drivers in the system (e.g., days prior to day "$D_0$" on which full system 10 commences operation), and actual ("ground truth") ride-hailing activity data for the same time periods obtained from and/or verified as accurate by each respective driver (i.e., "training data"), and the system 10 (e.g., the TACE 11) improves and refines the models and/or algorithms over time based on driver validation/corrections (e.g., the VCD 19) on and after $D_0$ as described above.

In the preferred embodiment, the TAD includes, but is not limited to, driver shift start/end location/time, shift distance/duration, trip start/end location/time, navigational routes (e.g., driving paths) and distance/duration for all trips within each shift, other attribution such as service provider(s), number of passengers, etc., periods of no passengers in vehicle, periods when en route to passenger pickup locations, periods when passenger(s) is(are) in the driver's vehicle en route to passenger destination, point of interest visits (e.g. airports, stadiums, retail, etc.), driver waiting/parking areas/events, other patterns such as "cruising" (e.g. circling of geographic areas while waiting for service requests), etc. For example, the TACE 11 could determine when and where a driver's ride-hailing shift starts and ends based on where and when the driver turns on and off the ride-hailing service app 48 on the driver's device 15. Conversely, the TACE 11 can determine when the driver is using the vehicle for non-ride-hailing purposes based on when the driver is using the vehicle outside of a shift. The TACE 11 may determine when and where trips occur during a shift start and end based on when the driver interacts with the ride-hailing service app to confirm pickup and dropoff of the passenger(s) and/or interactions with other applications on the driver's device 15, such as map and driving direction applications. The TACE may determine the number of passengers on a ride-hailing trip during a shift based on, for example, vehicle telematics data such as data from seat sensors in the driver's vehicle (e.g., whether seats are occupied), signature sounds and/or vehicle telematics data of car doors opening and closing, sounds from speakers in the vehicle, interactions with the ride-hailing service application 48 indicating the number of passengers, and/or the client application 46 sensing other devices in the vehicle through Bluetooth and/or WiFi signals from such other devices. The TACE 11 may estimate periods of no passengers in the vehicle based on the driver's driving pattern (determined by time-stamped geolocation data), the driver's interactions with the ride-hailing service application 48, the driver's interaction with other applications on the driver's device 15, sound data (e.g., absence of voices), and/or data about other mobile devices in the vehicle (in particular, the absence of them). The TACE 11 may estimate periods when the driver is en route to passenger pickups, when the driver is nears points of interests and/or other driving patterns based on similar data analyses. Still further, in instances where a driver works for multiple ride-hail services simultaneously, the TACE 11 could determine which service the driver is working for when transporting a particular passenger. For example, if the driver is working for two ride-hail services simultaneously, and has two driver ride-hail service software applications 48 on his/her driver mobile device 15, the TACE 11 could determine which service the driver was working for when it picked up a particular passenger at a particular time stamp based on the driver's interactions with the two driver ride-hail service software applications 48 at or around the time the passenger was picked-up. For example, if the driver confirmed pick-up of the passenger with the app 48 of the first ride-hail service by not with the second app 48, the TACE 11 may include that the pick-up was for the first ride-hail service.

In various embodiments, the TACE 11 may also use the time-stamped data from one or more other ride-hail drivers (e.g., one or more "second" drivers) as additional indicators to classify the driving activity of another ride-hail driver (a "first" driver). For example, if the TACE 11 is seeking to classify the driving activity of the first driver, and the TACE 11 determines that one or more other ("second") drivers, during a time period that the second drivers are determined to be working for a ride-hail service (as opposed to being off the clock), pick-up a passenger(s) near a particular venue at a certain time (or small time window) "$T_i$", and the first driver also was at or near the venue's location at the certain time (or time window) $T_i$, the TACE 11 can use the information about the other ("second") drivers to classify the driving activity for the first driver. For example, in this scenario, the TACE 11 may classify that the first driver was (i) on a ride-hail driving shift at the certain time and (ii) picked up a ride-hail passenger at the venue at/around the certain time (window) $T_i$, particularly if other time-stamped data from the first driver corroborates this classification (e.g., other first driver data at $T_i$ also suggests that the first driver may have picked up a passenger at the certain time at the venue). Likewise, the first driver's classified ride-hail activity at/around time window $T_i$ could be used to classify the driving activity of another ride-hail driver (e.g., a second driver) at $T_i$.

Further, the classified activity of the second driver used to inform the classification of the first driver (or vice versa) does not need to be from at or around the same time window $T_i$. For example, where a certain venue/location/region has a repeatable, historical pick-up and/or drop-off pattern, the TACE 11 can use historical classifications of other drivers at that venue/location/region to help classify the driving activity of the first driver. For example, if historically (e.g., some other days prior to the day "$D_j$" being analyzed) several other drivers (e.g., "second" drivers) were classified as picking-up a ride-hail passenger at a certain venue/location (e.g., a nightclub) around a certain time of day $T_i$ (e.g., closing time of the nightclub), the TACE 11 could use those historical classifications of other drivers to aid in the classification of the driving activity of the first driver if the first driver was at the location (e.g., the nightclub) at/around the particular time of day $T_i$ (e.g., closing time) on day $D_j$.

Likewise, the first driver's historical classified ride-hail activity at a particular venue/location/region could be used to classify the driving activity of another ride-hail driver (e.g., a second driver) at another (later) point in time.

Still further, the first driver's own historical classifications prior to time $T_i$ could also be used to aid in activity classification of the first driver at time (window) $T_i$. For example, if historically (e.g., some other days prior to the day "$D_j$" being analyzed) the first driver was classified as picking-up a ride-hail passenger at a certain venue/location (e.g., a nightclub) around a certain time $T_i$ (e.g., closing time of the nightclub), the TACE 11 could use those historical classifications to aid in the classification of the driving activity of the first driver if the first driver was at the location (e.g., the nightclub) at/around the particular time $T_i$ (e.g., closing time) on day $D_j$. This can be the case if the first driver tends to follow certain repeatable driving habits or "strategies", and tends to service certain areas more often than others, therefore increasing likelihood that the first driver is performing that similar activity at a later point in time. As an additional example, a prior classification that the first driver started a working shift at a time T reasonably close to, but prior to, the time $T_i$ being analyzed, greatly impacts the likelihood of rideshare activity (e.g. a passenger pickup) for the first driver at the subsequent time $T_i$.

Figure 3:
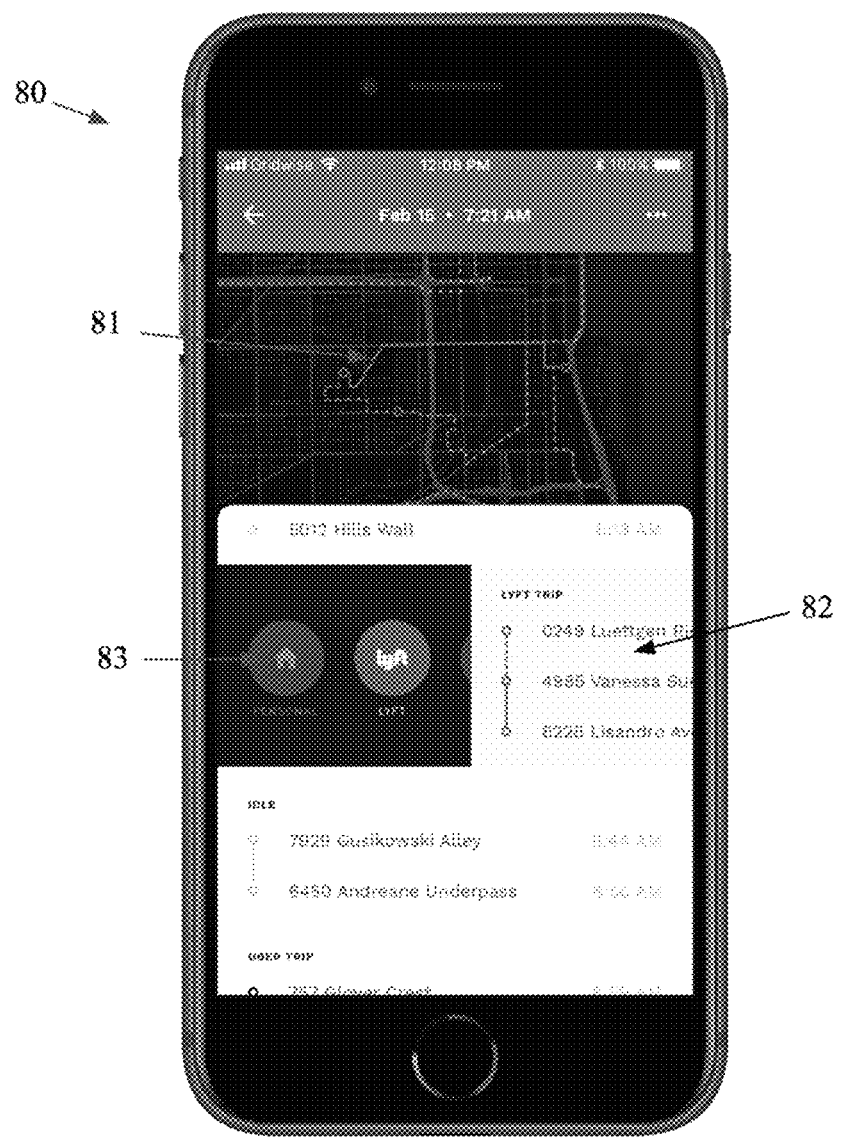
FIG. 3 is an example client application interface for drivers to validate the activity data generated by the system and method of the present invention.

Further, in some embodiments, the DI from the insights engine 27 may include, but is not limited to, cumulative and rate stats and metrics for transportation activity of each individual driver (shift times, passenger rides within shifts, etc.) or for an aggregate fleet of drivers as a whole, for a single rideshare service provider or multiple service providers in aggregate; activities broken down in various ways (e.g. by sub-geographical regions, service provider, driver attributes, time of day, etc.); point of interest servicing insights and metrics or other geographical or temporal service coverage patterns, origin-destination patterns, etc. Further still, VCD 19 from the drivers in the preferred embodiment are provided through the client application 46 via a software interface, an example of which is depicted in FIG. 3, in which the driver can interact with the display 44 of the drive's device 15 to confirm or deny the accuracy of TAD and DI determined by the remote back-end computing system 26 and transmitted to the driver's device 15. Examples of such corrections include, but are not limited to, marking certain driving activity as "non-working" that was thought by the system to be part of a working shift (and vice-versa), editing start/endpoint locations of working shifts and trips, or making revisions to incorrect shift or trip metadata, such as attributed service, passenger count, etc. In other embodiments, external sources of information may be used as VCD, such as other existing records or statements of drivers' earnings and trips for one or more services. In addition, alternate input modalities beside the display 44 may be used to provide the VCD, such as voice commands processed by the application 46.

Referring now to FIG. 2, wherein steps are shown for a particular embodiment of the method of the present invention in flow-diagram 58, which is employed for generating, storing, and delivering TAD and DI, and which may be implemented by the system 10 of FIG. 1, for example. Activity indicator data AID (preferred examples of which have been stated above) are collected from one or more driver devices 15 by the remote computing system 26 in step 50. As described above, the collected AID may be stored in the data store 12. At a later point in time, in step 51, the AID for one or more drivers is processed or re-structured into a more workable format, e.g. cleansed, tabulated, sorted, filtered, mapped, reduced, signal-processed, standardized, normalized, mathematically transformed, etc. A geospatial analysis step 52 is then applied to the geolocation indicator data, looking for spatial and temporal patterns that are indicative of TAD and/or are atypical for personal driving use cases. Examples of such patterns include, but are not limited to, winding, meandering, or "re-tracing" geographical routes; circling, cruising, or pull-over patterns; sharp turnarounds; reverse motion; long durations of driving motion or mileage, long durations of stationary activity; airport/transit station/other point of interest visits, etc. Some example analyses performed to discover such patterns may be spatial and temporal cluster analysis, computer vision, map image analysis, mathematical or statistical analysis of geolocation data attributes (latitude/longitude/time/velocity/heading/altitude/etc.), etc. The geospatial analysis step 52 could also consider classifications from other drivers or from the first driver's own history as described above. One or more additional non-geospatial data analyses in step 53 are applied to all other non-geospatial, timestamped AID, i.e. other device-originated indicator data, externally sourced indicator data, and manually indicated information input by the driver. Some non-geospatial analyses in step 53 may include time-clustering of third-party app usage/interaction data and/or onboard diagnostics data, and the characterization of timestamped audio or Bluetooth/Wi-Fi/cellular radio scan data, or other time-series analyses. Steps 51 through 53 may be performed by the TACE 11 of the back-end computing system 26.

The combined outputs of geospatial and non-geospatial analyses performed in steps 52 and 53 are input into a classifier step 54, e.g., implemented by the TACE 11, which decides whether the combination and superposition of all the inputs—synced with each other time using each AID point's timestamp—is representative of TAD or just personal driving/commuting, and further breaking down TAD into more granular representations, such as trips or points of interest, and still further labeling such TAD with various deduced or driver-supplied metadata. Then, step 59 is applied by the insights engine 27 to create the derived insights (DI) from the TAD (including but not limited to, additional summary metrics and breakdowns of activity by various dimensions at both the individual and aggregate levels). In a preferred embodiment of the system and method of this invention, the TAD output by the classifier is then validated or corrected by at least a portion of the drivers in step 55, and that VCD is used to iteratively evolve the classification model of the TACE 11 and improve its accuracy over time, as shown in step 57. Note that this step 57 may occur "online", i.e. continuously and automatically as part of each classification/validation cycle, or it may occur "offline", i.e. with only periodic updates to the model (via software updates by system administrators). It is also important to note that, while in this particular example flow-diagram 58 the steps 52, 53, 54, and 59 are depicted in series and in a specific order, these logical steps can be reordered, run in parallel, combined, or omitted in various embodiments and implementations of the present invention. Finally, at some other time, TAD and DI may be served to third-party consumers, e.g. end users of an analytics application or another automated software service, being delivered in a visual, textual, data feed, or document format.

FIG. 3 illustrates a diagram 80 of an example user interface that a driver could be presented with by the client application 46 to display TAD and DI, and through which a driver could input VCD back to the system 26. In the example interface, there is depicted visual and textual representations (81 and 82 respectively) of the system's output TAD, in this example a trip detail, with inputs provided for the driver to confirm or deny the TAD. More specifically, in the example user interface depicted in diagram 80, button 83 is present to allow the driver to indicate that a particular trip was a non-working ("personal") trip and not transportation activity that was part of a working shift. Visual and textual representations of the TAD are not both required to be present, and some embodiments may additionally include visual or textual feedback of the system's confidence in the accuracy of the initial classification prior to driver validation. Alternatively, VCD may be provided audibly by the driver using voice commands (upon audible or visual prompting from the client application) that are processed and interpreted by the client application 46 and sent back to remote back-end computing system 26. Other additional types of displays, controls, and interactive experiences may be equally effective for drivers to provide VCD back to the system for differing types of TAD, and are also included in the spirit of the invention described herein.

In the description above, the client application 46 and the ride-hailing service application(s) 48 are described as separate applications, and that the client application 46 is exposed to user interactions with the ride-hailing service application(s) 48 via the OS of the device 15. In other embodiments, the client application 46 and the ride-hailing service application(s) 48 could be integrated into a single application that runs on the drivers' devices 15.

In one general aspect, therefore, the present invention is directed to activity classification systems and methods for on-demand vehicle ride-hail services. The system comprises a back-end analytics computer system that comprises one or more computers, and a first driver mobile device that is associated with a first ride-hail driver who drives for one or more vehicle ride-hail services. The first driver mobile device is in communication with the back-end analytics computer system via a wireless data network. Further, the first driver mobile device comprises one or more data-reporting software applications that, when executed by the first driver mobile device, report time-stamped data to the back-end analytics computer system, wherein the reported time-stamped data comprises (i) time-stamped geo-location data for the first driver mobile device and (ii) additional, non-geo-location, time-stamped data of the first driver mobile device. The back-end analytics computer system is programmed to: (a) using the time-stamped geo-location data and the additional, non-geo-location, time-stamped data from the first driver mobile device, classify driving activity for the first ride-hail drivers to one or more classifications, wherein a driving activity classification for the first ride-hail driver is determined, at least in part, based on the time-stamped geo-location data and the additional, non-geo-location, time-stamped data from the first mobile driver device; and (b) transmit an outcome of the one or more driving activity classifications for the first ride-hail driver to one or more remote computer devices (e.g., various analytics systems and/or the driver mobile devices) that is in communication with the back-end analytics computer system.

A method according to various embodiments of the present invention comprises the step of reporting, by one or more data-reporting software applications running on a first driver mobile device of a first ride-hail driver that drives for one or more ride-hail services, to a back-end analytics computer system that comprises one or more computers, via a wireless network, time-stamped data that comprises (i) time-stamped geo-location data for the first driver mobile device and (ii) additional, non-geo-location, time-stamped data of the first driver mobile device. The method also comprises the step of, based on the time-stamped geo-location data and the additional, non-geo-location, time-stamped data from the first driver mobile device, classifying, by the back-end computer analytics computer system, driving activity for the first ride-hail driver to one or more classifications, wherein a driving activity classification for the first ride-hail driver is determined, at least in part, based on the time-stamped geo-location data and the additional, non-geo-location, time-stamped data from the first mobile driver device of the first ride-hail driver. The method further comprises the step of transmitting, by the back-end analytics computer system, an outcome of the one or more classifications for the first ride-hail driver to a remote computer device.

In various implementations of the systems and methods, the first driver mobile device is one of a plurality of driver mobile devices that is in communication with the back-end analytics computer system, where each of the plurality of driver mobile devices is associated with a unique ride-hail driver, such that there are a plurality of ride-hail drivers. In that case, the back-end analytics computer system is further programmed to: (i) classify driving activity for each of the plurality of ride-hail drivers; and (ii) transmit an outcome of the driving activity classifications for the plurality of ride-hail drivers to the remote computer device. Still further, the plurality of ride-hail drivers may comprise a second ride-hail driver, in which case, when classifying driving activity for the first ride-hail driver at a first time instance, the back-end analytics computer system further uses a driving activity classification of the second ride-hail driver to aid in classifying the driving activity for the first ride-hail driver.

In various implementations, the additional, non-geo-location, time-stamped data of the first driver mobile device that are reported by the one or more data-reporting software applications of the first driver mobile device and from which the driving activity classifications are made further comprise data about interactions of the first ride-hail driver with the first driver mobile devices. For example, the first driver mobile device of the first ride-hail driver may comprise at least one additional software application that is a driver ride-hail platform software application and/or a driving directions software application. In such circumstances, the additional, non-geo-location, time-stamped data of the first driver mobile device of the first ride-hail driver from which the driving activity classifications are made can comprise interaction data by the first ride-hail driver with the at least one additional software application.

In various implementations, the additional non-geo-location, time-stamped data of the first driver mobile device of the first ride-hail driver from which the driving activity classifications are made further comprise motion activity recognition data collected by the first driver mobile device of the first ride-hail driver. Such motion activity recognition data may indicate time periods when the first driver mobile device was in a vehicle that was driving, for example.

In various implementations, the additional non-geo-location, time-stamped data of the first driver mobile device of the first ride-hail driver from which the driving activity classifications are made further comprise sensor data collected by a sensor of the first driver mobile device of the first ride-hail driver. The sensor data comprise sensor data may comprise GPS data from a GPS receiver; motion data from one or more motion sensors; radio signal data; data from mobile device charging ports; and/or sounds captured by a microphone.

In various implementations, the back-end analytics computer system may use additional data to classify driving activity of the first ride-hail driver comprises additional data, such as time-stamped data from a third party data source that is in communication with the back-end analytics computer system; data input by the first ride-hail driver to the first driver mobile device or to an external device that is in communication with the first driver mobile device; one or more driving activity classifications for other ride-hail drivers in spatiotemporal proximity to the first ride-hail driver; and time-stamped vehicle telematics from the vehicle of the first ride-hail driver.

In various implementations, the one or more classification of driving activity comprise time periods spent driving for a ride-hail service and time periods spent not driving for the ride-hail service. More generally, the one or more classifications of driving activity may include start locations, end locations, navigational routes, and/or time periods spent with a ride-hail passenger in the vehicle during time spent driving for the ride-hail service; start locations, end locations, navigational routes, and/or time periods spent driving to a pick-up location to pick up a ride-hail passenger during time spent driving for the ride-hail service; start locations, end locations, navigational routes, and/or time periods spent without a ride-hail passenger in the vehicle during time spent driving for the ride-hail service; location and/or time periods spent waiting at or near a pick-up location for a confirmed ride-hail passenger during time spent driving for the ride-hail service; locations, navigational routes, and/or time periods, during time spent driving for the ride-hail service, spent without a ride-hail passenger in the vehicle and waiting for a ride-hail passenger to be assigned (e.g., waiting for a passenger request to be received); and/or when the first driver is driving for multiple ride-hailing services simultaneously, identifying for which ride-hail service the first driver is working for at a given time.

In various implementations, the back-end analytics computer system comprises an insights engine that generates aggregate ride-hail analytics from driving activity classifications for one or multiple ride-hail drivers. In that case, the outcome of the driving activity classification that is transmitted by the back-end analytics computer system to the remote computer device may comprise the aggregate ride-hail analytics.

In still further implementations, the outcome of the driving activity classification that is transmitted by the back-end analytics computer system to the remote computer device comprises the one or more driving activity classifications for the first ride-hail driver and the remote computer device to which the outcome of the classifications are transmitted comprise the first driver mobile device of the first ride-hail driver. In that case, the one or more data-reporting software applications on the first driver mobile device of the first ride-hail driver may: (i) generate a user interface display on the first driver mobile device of the first ride-hail driver that displays the outcome of the driving activity classification for the first ride-hail driver determined by the back-end analytics computer system; (ii) receive an input from the first ride-hail driver verifying the correctness of the displayed outcome of the driving activity classification; and (iii) transmit data representative of the verification of the displayed outcome of the driving activity classification by the first ride-hail driver to the back-end analytics computer system. Still further, the back-end analytics computer system may update one or more machine-learning classification or pattern recognition models used by the back-end analytics computer system to make subsequent driving activity classifications more accurate in response to the data representative of the verification of the displayed driving activity classification by the first ride-hail driver.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. An activity classification system for on-demand vehicle ride-hail services, the system comprising:
    a back-end analytics computer system that comprises one or more computers; and
    a first driver mobile device that is associated with a first ride-hail driver who drives for one or more vehicle ride-hail services, wherein the first driver mobile device is in communication with the back-end analytics computer system via a wireless data network, and wherein the first driver mobile device comprise one or more data-reporting software applications that, when executed by the first driver mobile device, report time-stamped data to the back-end analytics computer system, wherein the reported time-stamped data comprise (i) time-stamped geo-location data for the first driver mobile device and (ii) additional, non-geo-location, time-stamped data for the first driver mobile device,
    wherein the back-end analytics computer system is programmed to:
        using the time-stamped geo-location data and the additional, non-geo-location, time-stamped data from the first driver mobile device, classify driving activity for the first ride-hail drivers to one or more driving activity classifications, wherein the one or more driving activity classifications for the first ride-hail driver are determined, at least in part, based on the time-stamped geo-location data and the additional, non-geo-location, time-stamped data from the first mobile driver device; and
        transmit an outcome of the one or more driving activity classifications for the first ride-hail driver to a remote computer device that is in communication with the back-end analytics computer system, and
    wherein the one or more driving activity classifications comprise one or more of the following:
        start locations, end locations, navigational routes, and/or time periods spent with a ride-hail passenger in the vehicle during time spent driving for the ride-hail service;
        start locations, end locations, navigational routes, and/or time periods spent driving to a pick-up location to pick up a ride-hail passenger during time spent driving for the ride-hail service;
        location and/or time periods spent waiting at or near a pick-up location for a confirmed ride-hail passenger during time spent driving for the ride-hail service; and
        locations, navigational routes, and/or time periods, during time spent driving for the ride-hail service, spent without a ride-hail passenger in the vehicle and waiting for a ride-hail passenger to be assigned.

2. The system of claim 1, wherein:
    the first driver mobile device is one of a plurality of driver mobile devices that is in communication with the back-end analytics computer system, wherein each of the plurality of driver mobile devices is associated with a unique ride-hail driver, such that there is a plurality of ride-hail drivers; and the back-end analytics computer system is further programmed to:

classify driving activity for each of the plurality of ride-hail drivers; and transmit an outcome of the driving activity classifications for the plurality of ride-hail drivers to the remote computer device.

3. The system of claim 2, wherein:

the plurality of ride-hail drivers comprises a second ride-hail driver; and when classifying driving activity for the first ride-hail driver at a first time instance, the back-end analytics computer system further uses a driving activity classification of the second ride-hail driver to aid in classifying the driving activity for the first ride-hail driver.

4. The system of claim 1, wherein the additional, non-geo-location, time-stamped data of the first driver mobile device that are reported by the one or more data-reporting software applications of the first driver mobile device and from which the driving activity classifications are made comprise data about interactions of the first ride-hail driver with the first driver mobile device.

5. The system of claim 4, wherein:

the first driver mobile device of the first ride-hail driver comprises at least one additional software application that is selected from the group consisting of:
  a driver ride-hail platform software application; and
  a driving navigation software application; and the additional, non-geo-location, time-stamped data of the first driver mobile device of the first ride-hail driver from which the driving activity classifications are made comprise interaction data by the first ride-hail driver with the at least one additional software application.

6. The system of claim 1, wherein the additional non-geo-location, time-stamped data of the first driver mobile device of the first ride-hail driver from which the driving activity classifications are made further comprise motion activity recognition data collected by the first driver mobile device of the first ride-hail driver, wherein the motion activity recognition data indicate time periods when the first driver mobile device was in a vehicle that was driving.

7. The system of claim 1, wherein the additional non-geo-location, time-stamped data of the first driver mobile device of the first ride-hail driver from which the driving activity classifications are made further comprise sensor data collected by a sensor of the first driver mobile device of the first ride-hail driver, wherein the sensor data comprise sensor data selected from the group consisting of:

GPS data from a GPS receiver;
motion data from one or more motion sensors;
radio signal data;
data indicating mobile device charging status; and
sounds captured by a microphone.

8. The system of claim 1, wherein that data used by the back-end analytics computer system to classify driving activity of the first ride-hail driver comprises additional data, wherein the additional data comprises data selected from the group consisting of:

time-stamped data from a third party data source that is in communication with the back-end analytics computer system;

data input by the first ride-hail driver to an external device that is in communication with the first driver mobile device;

one or more driving activity classifications for other ride-hail drivers in spatiotemporal proximity to the first ride-hail driver; and time-stamped vehicle telematics data corresponding to the vehicle of the first ride-hail driver.

9. The system of claim 1, wherein the one or more driving activity classifications further comprise:

time periods spent driving for a ride-hail service; and
time periods spent driving but not driving for the ride-hail service.

10. The system of claim 1, wherein the one or more driving activity classifications further comprise:

when the first driver is driving for multiple ride-hailing services simultaneously or intermittently, identifying for which ride-hail service the first driver is working for at a given time.

11. The system of claim 2, wherein:

the back-end analytics computer system comprises an insights engine that generates aggregate ride-hail analytics from driving activity classifications for one or multiple ride-hail drivers; and the outcome of the driving activity classification that is transmitted by the back-end analytics computer system to the remote computer device comprises the aggregate ride-hail analytics.

12. The system of claim 1, wherein:

the outcome of the driving activity classification that is transmitted by the back-end analytics computer system to the remote computer device comprises the one or more driving activity classifications for the first ride-hail driver;

the remote computer device to which the outcomes of the classifications are transmitted comprise the first driver mobile device of the first ride-hail driver; and the one or more data-reporting software applications on the first driver mobile device of the first ride-hail driver;

generate a user interface display on the first driver mobile device of the first ride-hail driver that displays the outcome of the driving activity classification for the first ride-hail driver determined by the back-end analytics computer system;

receive an input from the first ride-hail driver verifying the correctness of the displayed outcome of the driving activity classification; and transmit data representative of the verification of the displayed outcome of the driving activity classification by the first ride-hail driver to the back-end analytics computer system.

13. The system of claim 12, wherein the back-end analytics computer system updates one or more machine-learning classification or pattern recognition models used by the back-end analytics computer system to make subsequent driving activity classifications more accurate in response to the data representative of the verification of the displayed driving activity classification by the first ride-hail driver.

14. A computer-implemented method for classifying activity for on-demand vehicle ride-hail services, the method comprising:

reporting, by one or more data-reporting software applications running on a first driver mobile device of a first ride-hail driver that drives for one or more ride-hail services, to a back-end analytics computer system that comprises one or more computers, via a wireless network, time-stamped data that comprises (i) time-stamped geo-location data for the first driver mobile device and (ii) additional, non-geo-location, time-stamped data of the first driver mobile device;

based on the time-stamped geo-location data and the additional, non-geo-location, time-stamped data from the first driver mobile device, classifying, by a back-end computer analytics computer system, driving activity for the first ride-hail driver to one or more driving activity classifications, wherein the one or more driving activity classifications for the first ride-hail driver determined, at least in part, based on the time-stamped geo-location data and the additional, non-geo-location, time-stamped data from the first mobile driver device of the first ride-hail driver; and transmitting, by the back-end analytics computer system, an outcome of the one or more driving activity classifications for the first ride-hail driver to a remote computer device, wherein the one or more driving activity classifications comprise one or more of the following:

start locations, end locations, navigational routes, and/or time periods spent with a ride-hail passenger in the vehicle during time spent driving for the ride-hail service;

start locations, end locations, navigational routes, and/or time periods spent driving to a pick-up location to pick up a ride-hail passenger during time spent driving for the ride-hail service;

location and/or time periods spent waiting at or near a pick-up location for a confirmed ride-hail passenger during time spent driving for the ride-hail service; and locations, navigational routes, and/or time periods, during time spent driving for the ride-hail service, spent without a ride-hail passenger in the vehicle and waiting for a ride-hail passenger to be assigned.

15. The method of claim 14, wherein:
the first driver mobile device is one of a plurality of driver mobile devices that is in communication with the back-end analytics computer system, wherein each of the plurality of driver mobile devices is associated with a unique ride-hail driver, such that there is a plurality of ride-hail drivers; and the method further comprises:
classifying, by the back-end analytics computer system, driving activity for each of the plurality of ride-hail drivers; and
transmitting, by the back-end analytics computer system, an outcome of the driving activity classifications for the plurality of ride-hail drivers to the remote computer device.

16. The method of claim 14, wherein the additional, non-geo-location, time-stamped data of the first driver mobile device that are reported by the one or more data-reporting software applications of the first driver mobile device and from which the driving activity classifications are made comprise data about interactions of the first ride-hail driver with the first driver mobile devices.

17. The method of claim 14, wherein the additional non-geo-location, time-stamped data of the first driver mobile device of the first ride-hail driver from which the driving activity classifications are made further comprise motion activity recognition data collected by the first driver mobile device of the first ride-hail driver, wherein the motion activity recognition data indicate time periods when the first driver mobile device was in a vehicle that was driving.

18. The method of claim 14, wherein the additional non-geo-location, time-stamped data of the first driver mobile device of the first ride-hail driver from which the driving activity classifications are made further comprise sensor data collected by a sensor of the first driver mobile device of the first ride-hail driver, wherein the sensor data comprise sensor data selected from the group consisting of:
GPS data from a GPS receiver;
motion data from one or more motion sensors;
radio signal data;
data indicating mobile device charging status; and
sounds captured by a microphone.

19. The method of claim 14, wherein the one or more driving activity classifications further comprise:
when the first driver is driving for multiple ride-hailing services simultaneously, identifying for which ride-hail service the first driver is working for at a given time.

20. The method of claim 14, wherein:
transmitting the outcome of the driving activity classification to the remote computer device comprises transmitting, by the back-end analytics computer system, the one or more driving activity classifications for the first ride-hail driver to the first driver mobile device; and the method further comprises:
generating, by the one or more data-reporting software applications on the first driver mobile device, a user interface display on the first driver mobile device of the first ride-hail driver that displays the outcome of the driving activity classification for the first ride-hail driver determined by the back-end analytics computer system;
receiving, by the one or more data-reporting software applications on the first driver mobile device, an input from the first ride-hail driver verifying the correctness of the displayed outcome of the driving activity classification;
transmitting, by the one or more data-reporting software applications on the first driver mobile device, data representative of the verification of the displayed outcome of the driving activity classification by the first ride-hail driver to the back-end analytics computer system; and
updating, by the back-end analytics computer system, one or more machine-learning classification or pattern recognition models used by the back-end analytics computer system to make subsequent driving activity classifications more accurate in response to the data representative of the verification of the displayed driving activity classification by the first ride-hail driver.

21. The system of claim 1, wherein the one or more driving activity classifications comprise two or more of the following driving activity classifications:
start locations, end locations, navigational routes, and/or time periods spent with a ride-hail passenger in the vehicle during time spent driving for the ride-hail service;
start locations, end locations, navigational routes, and/or time periods spent driving to a pick-up location to pick up a ride-hail passenger during time spent driving for the ride-hail service;
location and/or time periods spent waiting at or near a pick-up location for a confirmed ride-hail passenger during time spent driving for the ride-hail service; and locations, navigational routes, and/or time periods, during time spent driving for the ride-hail service, spent without a ride-hail passenger in the vehicle and waiting for a ride-hail passenger to be assigned.

22. The system of claim 1, wherein the one or more driving activity classifications comprise each of the following driving activity classifications:

start locations, end locations, navigational routes, and/or time periods spent with a ride-hail passenger in the vehicle during time spent driving for the ride-hail service;

start locations, end locations, navigational routes, and/or time periods spent driving to a pick-up location to pick up a ride-hail passenger during time spent driving for the ride-hail service;

location and/or time periods spent waiting at or near a pick-up location for a confirmed ride-hail passenger during time spent driving for the ride-hail service; and locations, navigational routes, and/or time periods, during time spent driving for the ride-hail service, spent without a ride-hail passenger in the vehicle and waiting for a ride-hail passenger to be assigned.

* * * * *